May 6, 1952

J. SOOS 2,595,900

HOSE COUPLING

Filed Oct. 14, 1948

INVENTOR.
JOSEPH SOOS
BY Hudson, Boughton,
Williams, David & Hoffmann.
ATTORNEYS Patented May 6, 1952

2,595,900

UNITED STATES PATENT OFFICE 2,595,900

HOSE COUPLING

Joseph Soos, Cleveland, Ohio, assignor to The Gabriel Company, Cleveland, Ohio, a corporation of Ohio Application October 14, 1948, Serial No. 54,558

7 Claims. (Cl. 285—84)

This invention relates to a coupling and, more particularly, to a coupling for a hose or the like.

An object of the invention is to provide an improved coupling of novel construction for a hose or the like, the coupling comprising a sleeve adapted to be positioned around the end of a hose, and a main body member including a tubular portion adapted to be inserted in the bore of the sleeved end of the hose and to thereafter be expanded, the said body member also including an integral portion overlying the sleeved portion of the hose adjacent the end thereof when the latter has had the tubular portion inserted therein, the said overlying portion having an inner surface such that the expansion of the tubular portion deforms the end portions of the sleeve and of the hose into locking engagement with the said overlying portion of the body member, thereby firmly locking the hose, sleeve and body member together.

Another object of the invention is to provide an improved hose coupling comprising a sleeve adapted to be positioned around the end of a hose, a main body member including an external flange and a tubular portion extending axially therefrom with the said tubular portion being adapted to be inserted in the sleeved end of the hose, the said flange having an axially extending recess in the side face thereof which is adjacent the said tubular portion with the outer wall of said recess tapering toward said tubular portion and with the space between said tubular portion and the outer edge of said tapering wall of the recess being sufficient to receive the sleeved end of the hose, the said tubular portion being adapted to be expanded outwardly whereupon a portion of the sleeve positioned in said recess is deformed into engagement with the tapered wall of said recess, thereby locking the sleeve and member together and firmly securing the hose between the sleeve and the said tubular portion of the body member.

A further object of the invention is to provide an improved hose coupling as defined in the preceding object and in which the said sleeve has an inturned flange overlying the end of the hose to which it is applied, the inner periphery of said flange cooperating with the said tubular portion of the body member to effect deformation of the said sleeve when the said tubular portion is expanded.

The invention further resides in certain novel features of construction and combination and arrangements of parts, and further objects and advantages thereof will be apparent to those skilled in the art to which it pertains from the following description of the present preferred embodiment, and certain modifications thereof, described with respect to the accompanying drawing in which similar reference characters represent corresponding parts in the several views and in which, Fig. 1 is a side view, partly in longitudinal section and partly in elevation, showing the present preferred form of the main body member of the coupling;

Fig. 3 is a view, partly in side elevation and partly in longitudinal section, showing the sleeved hose as applied to the main body member of the coupling prior to expanding the tubular portion of the body member, the main body member being similar to that in Fig. 1 except for the means provided for effecting attachment of the coupling to a pipe or the like;

Figure 1:
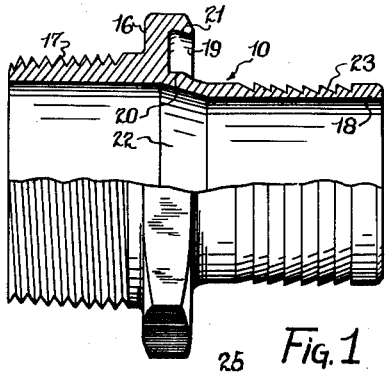
Figure 2:
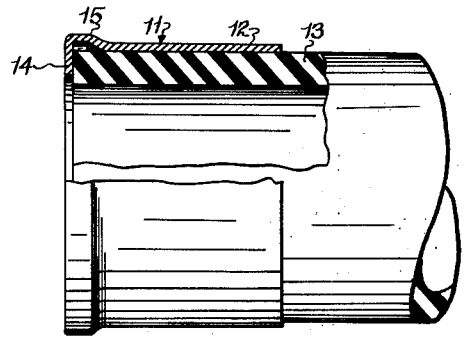
Fig. 2 is a fragmentary side view, partly in elevation and partly in longitudinal section, showing the sleeve of the coupling positioned about the end of a hose to which the coupling is to be applied.
Figure 3:
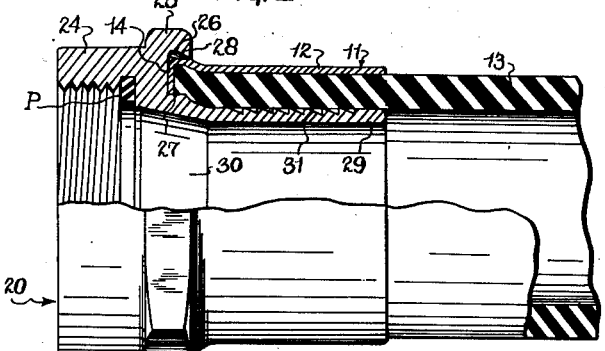
Figure 4:
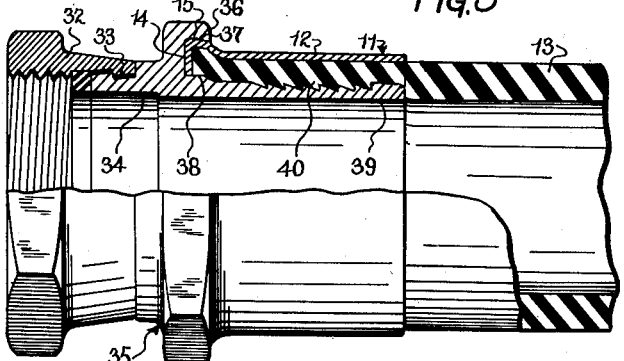
Figure 5:
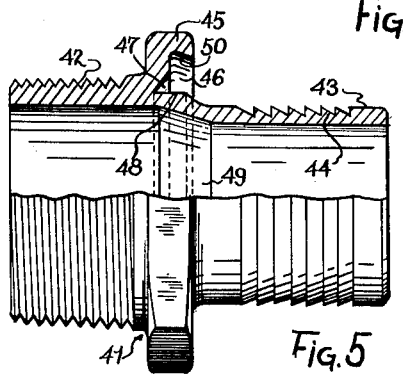

Fig. 4 is a view, partly in side elevation and partly in longitudinal section, showing the improved coupling after the tubular portion of the main body member has been expanded to lock the hose and the parts of the coupling together, the main body member being the same as shown in Figs. 1 and 3 except for the means for connecting the coupling to a pipe or the like; and, Fig. 5 is a view, partly in side elevation and partly in section, of another form of main body member which may be employed with a sleeved hose similar to that shown in Fig. 2.

As shown in Figs. 1 and 2 of the drawing, the novel coupling comprises a main body member, designated generally 10, and a sleeve 11. The sleeve 11 comprises a tubular portion 12 having a diameter such as to slip over the end of the hose 13 to be coupled. The forward end of the sleeve 11, that is, the portion shown to the left in Fig. 2, comprises an integral inturned flange 14 which is adapted to overlie at least a part of the outer edge of the hose 13. Intermediate the flange 14 and the cylindrical portion 12, the sleeve 11 has an integral external shoulder 15 which is spaced outwardly from the adjacent outer surface of the hose 13.

The main body member 10 is hollow and includes an integral external flange portion 16 intermediate substantially tubular portions 17 and 18 which extend axially from the flange 16 on either side thereof. The portion 17 is provided with means for connecting the completed coupling to a pipe, conduit, or the like, not shown, this means, in the form of the body member shown in Fig. 1, comprising external screw threads on the portion 17. The tubular portion 18 is adapted to be inserted within the bore of the hose 13 which is to be provided with the coupling, the portion 18 preferably having a sliding fit within the bore of the hose and being adapted to be expanded after insertion in the hose as hereinafter described.

The side face of the flange 16, adjacent the tubular portion 18, is provided with an annular recess or counterbore 19 which is coaxial with the tubular portion 18, the inner side wall of this recess providing a substantially cylindrical shoulder 20. The outer side wall 21 of the recess or counterbore 19 tapers from the base of the recess towards the tubular portion 18 so that the width of the recess is greater adjacent its base than at the entrance to the recess. The flanged end of the sleeve 11 and the end of the hose 13 are adapted to be inserted in the recess 19 of the body member and hence the inner diameter of the sleeve flange 14 is such that this flange has a sliding fit on the shoulder 20 while the outside diameter of the shoulder 15 of the sleeve 11 is substantially equal to or slightly less than the diameter of the outer edge of recess 19. Hence, the tubular portion 18 of the body member 10 may be readily inserted in the bore of the sleeved end of the hose 13 with the ends of the sleeve and hose received in the recess 19.

It will be observed that the bore in the portion 17 of the main body member 10 has a diameter equal to or greater than that of the bore of the hose 13, while the bore of the tubular portion 18 initially has a diameter less than the internal diameter of the hose 13. These two bores in the main body member are united by a tapering surface 22 which is adapted to be engaged by a suitable tool, after the parts of the coupling have been positioned together as mentioned above, to effect expansion of the tubular portion 18 to an extent such that its internal diameter is substantially equal with that of the bore of the hose 13, thereby locking the hose and sleeve with the main body member as hereinafter described. Preferably the external circumference of the tubular portion 18 is provided with annular grooves, serrations, or the like, 23 to improve its gripping action upon the hose 13. The flange member 16 may have its external surface provided with a polygonal shape, if desired, to receive a wrench or similar tool.

Referring now to Fig. 3, the main body member shown therein is substantially the same as that shown in Fig. 1 except that the connecting means is a portion 24 provided with female threads and having a recess adjacent the base of the threads in which a packing washer P may be received. This body member is otherwise like that designated 10 and has a flange portion 25 provided with a counterbore or recess 26 having a cylindrical shoulder 27 and a tapered outer side wall 28 identical with the same parts designated 16, 19, 20 and 21 in Fig. 1. Likewise, the body member has a tubular portion 29, adapted to be inserted into the bore of a hose, an internal tapering surface 30 uniting the bores of the portions 29 and 24, and the outer surface of the tubular portion 29 is preferably grooved or serrated as indicated at 31, these various features being identical with the same portions of the body member 10.

Fig. 3 illustrates the coupling assembled about the hose 13 prior to the locking of the parts together. This assembly is effected, as previously described, by initially providing the hose 13 with a sleeve 11 having a cylindrical portion 12 of suitable diameter for the outside diameter of the hose coupled, the sleeve being positioned as shown in Fig. 2. The sleeved portion of the hose is then inserted in the recess of the flange on the body member so that the inner edge of the flange 14 rests upon the cylindrical shoulder forming the inner side wall of the recess, and the tubular portion of the main body member extends into the bore of the hose, the position of the parts then being as shown in Fig. 3. Preferably the flange 14 has an inner diameter such that its inner edge is disposed outwardly slightly with respect to the bore of the hose so that the inner edge of the hose is slightly deformed when the parts are fitted as shown in Fig. 3.

With the parts thus positioned, a suitable tool is forced through the main body member thereby engaging the sloped or tapered surface, such as 22 or 30, and forcing this surface, together with the tubular portion such as 18 or 29, outwardly by expansion of the metal forming these parts. The tool thus used in expanding is preferably of such diameter that the tubular portion, such as 18 or 29, of the coupling is expanded to an extent such that its bore is of substantially uniform diameter and coextensively with the bore of the hose 13. This expansion of the tubular portion of the main body member causes the hose to be firmly gripped between the tubular portions of the body member and the sleeve and also causes the cylindrical shoulder, such as 20, 27, to be displaced substantially radially thus forcing the flange 14 on the sleeve 11 substantially radially outwardly and thereby deforming the flange 15 of the sleeve into engagement with the tapered side wall, such as 21, 28, of the main body member. The position of the parts after this expanding operation is shown in Fig. 4 which illustrates a modified form of main body member differing from those shown in Fig. 3 only in the connecting means for the coupling. It will therefore be apparent that the completed coupling has the sleeved end of the hose firmly locked with the main body member, the teeth provided by the serrations or grooves, such as 23, 31, biting into the material of the hose to prevent axial displacement of the latter and the sleeve and hose being interlocked with the recess in the flange of the main body member by deformation of the sleeve and of the hose.

As mentioned above, Fig. 4 shows an assembled coupling of the type described above, this figure illustrating, however, a further modification of the connecting means by which the coupling may be attached to a pipe or the like. The connecting means in the present instance is illustrated as a swivel nut 32 having a female thread for connection to a pipe or the like, the rear portion of the nut having, as is well-known, an inwardly extending flange portion 33 received in a cooperating circumferential groove on the portion 34 of the main body member 35. This main body member 35, like the body members shown in Figs. 1 and 3, has an external flange 36 provided with a recess, having a tapered side wall 37 and a cylindrical side wall or shoulder 38, for reception of the sleeved end of a hose as previously described with respect to the corresponding parts 16, 21, 20, and 25, 28, 27, respectively, of the body members shown in Figs. 1 and 3. Likewise, the body member 35 has a tubular portion 39, provided with serrations or notches 40, positionable within the bore of the hose in the same manner as are the similar parts shown in Figs. 1 and 3. Since Fig. 4 illustrates the finished assembly of the coupling, the inclined surface, such as 22 and 30, between the bores of the two end portions of the coupling member, has now become coextensive with the bore through the tubular portion 39, due to the operation of the expanding tool, and hence does not appear as a separate surface. It will be understood that the surfaces 22 and 30 of the coupling members shown in Figs. 1 and 3 will likewise merge with the bores of the portions 18 and 29 in the same manner.

The main body member 41 shown in Fig. 5 comprises a male threaded connecting portion 42, a tubular portion 43 provided with grooves or serrations 44, and an external flange 45, these parts being the same as the corresponding parts shown in Fig. 1. Likewise, the flange 45 has a recess or counterbore 46, similar to that designated 19 in Fig. 1, except that in the instant embodiment the base of the recess or counterbore 46 is provided with a circumferentially extending notch or recess 47 adjacent the shoulder 48 which forms the inner side wall of the recess 46. This additional recess is shown as being substantially V-shape in cross section but may have other configurations if desired. The body member 41 cooperates with a sleeved hose as previously described and hence the description thereof need not be repeated. It will be observed, however, that in the form shown in Fig. 5, the expansion of the tubular portion 43, when the expanding tool engages the sloping or tapering surface 49 and continues through the tubular portion 43, is facilitated by the presence of the notch or recess 47, which provides space for the deflection of the material adjacent the corner between the base of the recess and the shoulder 48. As before, this expansion of the portion 43 deforms the sleeve and hose into locking engagement with the tapering surface 50 of the recess 46 and also clamps the hose between the sleeve 11 and the tubular portion 43. While only the body member 41, illustrated in Fig. 5, is shown with a recess 47 to facilitate the expansion of the tubular portion inserted in the hose, it will be apparent that a similar recess may be provided in the flange of each of the other body members shown, if desired.

It will now be understood that couplings formed in the manner herein shown and described provide an extremely firm locking of the hose with the coupling which is not only fluid-tight but also extremely mechanically strong, the sleeve and the main body member being positively interlocked so that the parts cannot be displaced and the coupling destroyed without exertion of abnormal forces. Moreover, since the locking of the sleeve to the main body member is effected by expanding the tubular portion of the main body member, the portion of the flange providing the tapered side wall of the recess may be made quite rigid, since it is not deflected to effect the securing of the sleeve to the main body member. Consequently an axial pull exerted upon the coupling does not spread this overlapping portion of the flange from engagement with the sleeve as would be the case if the engagement with the sleeve had been effected by making the overhanging portion of the flange sufficiently flexible to deform over the flange on the sleeve.

Various modifications and adaptations of the coupling herein shown and described may be effected without departing from the spirit of the invention. For example, instead of the outer side wall, such as 21, 28, 37 or 50, of the recess in which the sleeve is positioned being tapered as shown, this side wall may be otherwise formed to effect securing of the sleeve therein when the tubular portion, such as 18, 29, 39 or 43, is expanded. For example, the side wall, such as 21, etc., of the recess may be made substantially cylindrical, the outer edge of the recess adjacent this outer side wall then having an inturned integral flange portion. Furthermore, the portion of the flange of the main body member which overhangs and grips the end of the sleeve in the assembled form of the coupling need not be continuous, although this is preferable. Other modifications will readily occur to those skilled in the art and hence it is to be understood that the illustrated and described constructions simply represent practical embodiments of the invention and are to be construed as examples rather than as limitations of the invention.

Having thus described the invention, I claim:

1. A two-part coupling for a hose or the like, one part of said coupling comprising a main body member including a tubular portion, an external flange on said body member adjacent one end of said tubular portion, the said flange having an annular recess in the face thereof adjacent said tubular portion with the inner side wall of said recess being cylindrical and the outer side wall of said recess having portions thereof at different distances from the external circumference of said tubular portion with the greatest distance between said outer side wall and tubular portion being adjacent the base of said recess, the bore of said tubular portion having a surface underlying said recess adapted to be engaged by a tool inserted in said bore for expansion of the said tubular portion, the other part of said coupling comprising a sleeve provided with an inturned flange adjacent one end thereof, the said sleeve being adapted to have its flanged end inserted in the said recess with the inner circumference of said sleeve flange having a sliding fit on the cylindrical side wall of the recess thereby providing an annular space between said sleeve and the outer circumference of the tubular portion of said body member for the reception of a hose or the like to be coupled, whereby expansion of said tubular portion of the body member underlying said recess causes the said sleeve flange to move substantially radially outwardly deforming the sleeve within said recess thereby providing a region of said sleeve in the recess of greater diameter than the size of the opening into said recess so that the sleeve is locked to the said body member, the said expansion of the tubular portion also securing the said sleeve and said tubular portion of the body member to a hose or the like positioned therebetween.

2. A hose coupling as defined in claim 1 and wherein said sleeve further includes an integral external shoulder adjacent the said inturned flange, the said sleeve shoulder having an outside diameter substantially equal to the diameter of the entrance to said recess.

3. A two-part coupling for a hose or the like, one part of said coupling comprising a main body member including a tubular portion, an external flange on said body member adjacent one end of said tubular portion, the said flange having an annular recess in the face thereof adjacent said tubular portion with the inner side wall of said recess being cylindrical and the outer side wall of said recess having portions thereof at different distances from the external circumference of said tubular portion with the greatest distance between said outer side wall and tubular portion being adjacent the base of said recess, the bore of said tubular portion including a tapering surface adapted to be engaged by a tool inserted in the said tubular portion to expand the latter, the other part of said coupling comprising a sleeve provided with an inturned flange adjacent one end thereof, the said sleeve being adapted to have its flanged end inserted in the said recess with the inner circumference of said sleeve flange having a sliding fit on the cylindrical side wall of the recess thereby providing an annular space between said sleeve and the outer circumference of the tubular portion of said body member for the reception of a hose or the like to be coupled, whereby expansion of said tubular portion of the body member causes the said sleeve flange to move substantially radially outwardly deforming the sleeve within said recess providing a region of said sleeve in said recess of greater diameter than the size of the opening into the said recess thereby locking the sleeve to said body member, the said expansion of the tubular portion also securing the said sleeve and the said tubular portion of the body member to a hose or the like positioned therebetween.

4. A coupling as defined in claim 3 and wherein the flange on said body member is provided with a second annular recess having a width less than that of said first-mentioned recess and extending axially inwardly of said body member flange from the base of said first-mentioned recess thereby facilitating the expansion of said tubular portion.

5. A hose coupling as defined in claim 3 and wherein said sleeve further includes an integral external shoulder adjacent the said inturned flange, the external diameter of said shoulder being such that the flanged end of the sleeve is freely slidable into said recess with at least a portion of said shoulder disposed therein, the remainder of said sleeve being substantially cylindrical and having a diameter less than the outside diameter of said shoulder.

6. A coupling as defined in claim 3 and wherein the said body member further comprises a second tubular portion extending axially from said flange and communicating with said first-mentioned tubular portion and means on said second-mentioned tubular portion providing a part of a detachable connection for said coupling.

7. A two-part coupling for a hose or the like, one part of said coupling comprising a main body member including a tubular portion, an external flange on said body member adjacent one end of said tubular portion, the said flange having an annular recess in the face thereof adjacent said tubular portion with the inner side wall of said recess being cylindrical and the outer side wall of the recess tapering towards the said tubular portion, the bore of said tubular portion including a tapering surface adapted to be engaged by a tool inserted in the said bore to expand the tubular portion, the other part of said coupling comprising a sleeve provided with an inturned flange adjacent one end thereof, the said sleeve being adapted to have its flanged end inserted in said recess with the inner circumference of said sleeve flange having a sliding fit on the cylindrical side wall of the recess thereby providing an annular space between said sleeve and the outer circumference of the tubular portion of said body member for reception of a hose or the like to be coupled, whereby expansion of said tubular portion of the body member causes the said sleeve flange to move substantially radially outwardly to deform the sleeve within said recess providing a region of said sleeve in said recess of greater diameter than the size of the opening into the said recess thereby locking the sleeve to said body member, the said expansion of the tubular portion also securing the said sleeve and the said tubular portion of the body member to a hose or the like positioned therebetween.

JOSEPH SOOS.

REFERENCES CITED

The following references are of record in the file of this patent:

UNITED STATES PATENTS

| Number | Name | Date |
| --- | --- | --- |
| 213,577 | Kennedy | Mar. 25, 1879 |
| 964,579 | Stephens | July 19, 1910 |
| 1,901,088 | Dick | Mar. 14, 1933 |
| 1,974,383 | Wallace | Sept. 18, 1934 |
| 2,086,703 | Eastman | July 13, 1937 |
| 2,181,673 | Tompkins | Nov. 28, 1939 |
| 2,216,839 | Hoffman | Oct. 8, 1940 |
| 2,314,000 | Lusher | Mar. 16, 1943 |